3,268,594
DIMETHYL ACETALS OF ALPHA,BETA ACETYLENIC ALDEHYDES
Paul Bedoukian, 40 Ashley Road, Hastings on Hudson, N.Y.
No Drawing. Filed Nov. 1, 1962, Ser. No. 234,848
4 Claims. (Cl. 260—615)

This invention relates to perfumes and has for its object the provision of a class of organic compounds which have strong but pleasant odors making them useful in the creation of perfume fragrances for the cosmetic, soap and related industries. The new compounds of the invention not only have strong and pleasant odors but they possess the highly desirable floral green odors useful in the perfume industry.

In the synthesis of the new compounds of the invention I discovered that the dimethyl acetals of the alpha,beta acetylenic aldehydes, $CH_3 \cdot (CH_2)_n \cdot C\!:\!C \cdot CH(OCH_3)_2$ where $n$ is 3 to 7, have amazing odors, and my invention provides these new compounds and formulations comprising them.

The diethyl acetals of the alpha,beta acetylenic aldehydes have been reported in the literature, for example, Moureu and Delange (Bull. Soc. Chim. 3, 31, 1333 (1904), who reported that both $$CH_3 \cdot (CH_2)_4 \cdot C\!:\!C \cdot CH(OC_2H_5)_2$$

and $CH_3 \cdot (CH_2)_5 \cdot C\!:\!C \cdot CH(OC_2H_5)_2$ had only faint odors. It was surprising to find that although the diethyl acetals have faint odors which give them no utility in the perfume or cosmetic products the dimethyl acetals of the invention have such odor properties that they are very effective in such products.

The manufacture of the dimethyl acetals can be accomplished in a number of ways, the choice depending upon the economics of the raw materials available. I have used the well-known Grignard process for their preparation. As is known, this process can be carried out in different solvents and lends itself to considerable modification. The following is one practical procedure for the preparation of four alpha,beta acetylenic aldehydes listed below.

In a suitable apparatus, consisting of a three neck flask with a stirrer and reflux condenser, are placed 1.25 moles (about 30 gms.) of magnesium turnings and 250 ml. of anhydrous ether. To this is added gradually, from a separatory funnel, a mixture of 1.3 moles (about 140 gms.) of ethyl bromide at a rate to cause gentle refluxing of the ether. At the end of the reaction, the mixture is heated for fifteen minutes under reflux to insure the completion of the reaction. To the reaction mixture is added 1.25 moles (about 110 gms.) of 1-octyne mixed with 50 ml. of anhydrous ether. This reacts with the ethyl magnesium Grignard liberating ethane and giving 1-octyne magnesium Grignard $(CH_3 \cdot (CH_2)_5 \cdot C\!:\!CMgBr)$. Again, the rate of addition is controlled so that a gentle refluxing of the ether takes place. At the end of the reaction the mixture is heated to reflux for a period of half an hour to insure the completion of the reaction. The third step of the reaction consists of the addition of trimethyl orthoformate to the octyne Grignard reagent. In order to obtain higher yields, 1.25 moles (about 130 gms.) of trimethyl orthoformate is mixed with 150 ml. of toluene and added to the reaction mixture. The mixture refluxes gently on addition of the orthoformate at a proper rate. At the end of the reaction, another 150 ml. of toluene is added and the ether is slowly distilled off from the reaction mixture. After the removal of the ether, the mixture is refluxed gently for a period of five hours to insure increased yields. The thick reaction product containing much precipitated matter is hydrolyzed with excess ammonium chloride solution, washed with water, then with sodium carbonate solution, and subjected to careful fractional distillation. The fraction, 98 gms. (about 53 percent of theory), distilling at 86–88° C. at 4 mm. Hg pressure and having a refractive index of 1.438 and a specific gravity of 0.897 at 20° C. is relatively pure dimethyl acetal of 2-nonynal.

Three other homologs of the dimethyl acetals of 2-nonynal prepared by the above operation were found to have the following constants:

2-octynal dimethyl acetal, B.P.$_{22}$ 109° C., $n$ 20/D 1.436, sp. gr. 0.900

2-decynal dimethyl acetal, B.P.$_2$ 94° C., $n$ 20/D 1.4410, sp. gr. 0.894

2-undecynal dimethyl acetal, B.P.$_2$ 106° C., $n$ 20/D 1.4386, sp. gr. 0.890

Because of the strong fragrance, and particularly the floral green odors, of the new compounds they may be used very effectively in perfume fragrance formulations. The following are representative perfume fragrance formulations of the invention:

Jasmine fragrance

| | |
|---|---|
| Benzyl acetate | 16 |
| Benzyl alcohol | 5 |
| Linalool | 8 |
| Linalyl acetate | 3 |
| Terpineol | 1 |
| Amyl cinnamic aldehyde | 6 |
| Cyclamen aldehyde | 2 |
| Ylang ylang oil | 3 |
| Benzyl salicylate | 8 |
| 2-nonynal dimethyl acetal | 1.25 |

Rose fragrance

| | |
|---|---|
| Geraniol | 10 |
| Citronellol | 4 |
| Geranyl acetate | 3 |
| Phenyl ethyl alcohol | 8 |
| Decyl aldehyde | 0.1 |
| Phenyl acetaldehyde | 0.1 |
| Methyl ionone | 4 |
| Clove oil | 1 |
| Iso-cyclo citral | 0.5 |
| 2-nonynal dimethyl acetal | 0.5 |

Soap fragrance

| | |
|---|---|
| Benzyl acetate | 15 |
| Phenyl ethyl alcohol | 3 |
| Terpineol | 3 |
| Rosewood oil | 3 |
| Cyclamen aldehyde | 4 |
| Amyl cinnamic aldehyde | 8 |
| Cinnamic alcohol | 2 |
| Musk zylol | 5 |
| Lavandin oil | 2 |
| Anisic aldehyde | 1 |
| Coumarin | 1 |
| Clove oil | 1 |
| Geraniol | 5 |
| Terpeneless petitgrain oil | 4 |
| Geranyl acetate | 3 |
| Linalool | 5 |
| Methyl ionone | 5 |
| Hydroxycitronellal | 4 |
| 2-nonynal dimethyl acetal | 1.5 |

The foregoing compositions may be made by substituting for the 2-nonynal dimethyl acetal one of the other compounds of the invention.

I claim:
1. The dimethyl acetals represented by the formula $CH_3 \cdot (CH_2)_n \cdot C{:}C \cdot CH(OCH_3)_2$ where $n$ is an integer from 3 to 7 inclusive.
2. The compound 2-octynal dimethyl acetal.
3. The compound 2-decynal dimethyl acetal.
4. The compound 2-undecynal dimethyl acetal.

References Cited by the Examiner

UNITED STATES PATENTS 2,840,613  6/1958  Howk et al. _____ 260—615 X

OTHER REFERENCES

Moncrieff: The Chemistry of Perfumery Materials (1949), pages 71 and 72.

Post: The Chemistry of Aliphatic Orthoesters (1943), pages 96–105.

LEON ZITVER, *Primary Examiner.*

LORRAINE A. WEINBERGER, *Examiner.*

B. HELFIN, H. T. MARS, *Assistant Examiners.*